United States Patent
Warren et al.

(10) Patent No.: US 6,281,172 B1
(45) Date of Patent: Aug. 28, 2001

(54) QUATERNARY NITROGEN CONTAINING AMPHOTERIC WATER SOLUBLE POLYMERS AND THEIR USE IN DRILLING FLUIDS

(75) Inventors: Brent Warren, Calgary (CA); Peter M. van der Horst, Arnhem; Theodorus A. van't Zelfde, Nijkerk, both of (NL)

(73) Assignee: Akzo Nobel NV (NL)

(*) Notice: Subject to any disclaimer, the term of this patent is extended or adjusted under 35 U.S.C. 154(b) by 0 days.

(21) Appl. No.: 09/287,903

(22) Filed: Apr. 7, 1999

(51) Int. Cl.$^7$ ..................................... C09K 7/02
(52) U.S. Cl. ................ 507/110; 507/111; 507/112; 507/113; 507/114; 507/115; 507/118; 507/119; 507/120; 507/121; 507/122; 507/123
(58) Field of Search .................... 507/110, 111, 507/112, 113, 114, 115, 118, 119, 120, 121, 122, 123

(56) References Cited

U.S. PATENT DOCUMENTS

| | | | |
|---|---|---|---|
| 3,472,840 | 10/1969 | Stone et al. | 260/231 |
| 4,289,642 | 9/1981 | Weber et al. | 252/99 |
| 4,505,828 * | 3/1985 | Lipowski et al. | 507/120 |
| 4,540,496 * | 9/1985 | Peiffer et al. | 507/121 |
| 4,554,081 * | 11/1985 | Borchardt et al. | 507/120 |
| 4,637,882 | 1/1987 | Peiffer et al. | 252/8.514 |
| 4,652,623 | 3/1987 | Chen et al. | 526/287 |
| 4,663,159 | 5/1987 | Brode, II et al. | 424/70 |
| 4,940,785 | 7/1990 | Stober et al. | 536/90 |
| 4,985,410 | 1/1991 | Conti | 514/54 |
| 5,026,490 * | 6/1991 | Peiffer et al. | 507/122 |
| 5,101,903 | 4/1992 | Llave et al. | 166/294 |
| 5,387,675 | 2/1995 | Yeh | 536/18.7 |
| 5,510,436 * | 4/1996 | Hille et al. | 507/121 |
| 5,597,783 * | 1/1997 | Audibert et al. | 507/120 |
| 5,607,902 * | 3/1997 | Smith et al. | 507/120 |
| 5,663,123 | 9/1997 | Goodhue, Jr. et al. | 507/225 |
| 6,110,876 * | 8/2000 | Diggs et al. | 507/120 |
| 6,124,244 * | 9/2000 | Murphey | 507/120 |

FOREIGN PATENT DOCUMENTS

| | | | |
|---|---|---|---|
| 0 149 249 | 7/1985 | (EP) | C08B/11/145 |
| 0 189 935 | 8/1985 | (EP) | C08B/11/193 |
| 0 212 145 | 3/1987 | (EP) | A61K/31/72 |
| 0 339 372 | 11/1989 | (EP) | C08F/251/00 |
| 0 632 057 | 1/1995 | (EP) | C08B/37/14 |

OTHER PUBLICATIONS

*SPE Drilling & Completion*, Sep. 1993, *Chemical Characterization of CMC and Its Relationship to Drilling–Mud Rheology and Fluid Loss*, T. L. Hughes, T.G.J. Jones and O.H. Houwen, p. 157164.

*SPE, The Development of Potassium Cellulosic Polymers and Their Contribution to the Inhibition of Hydratable Clays*, S. Palumbo, D. Giacca, M. Ferrari, P. Pirovano, Lambeti, pp. 173–182, (1989).

*SPE, The Visualization of Fluid–Loss Polymers in Drilling Mud Filter Cakes*, J.P. Plank, F. A. Gossen, pp. 165–176, (1989).

* cited by examiner

*Primary Examiner*—Philip Tucker
(74) *Attorney, Agent, or Firm*—Lainie E. Parker; Ralph J. Mancini

(57) ABSTRACT

Water based drilling fluid compositions which contain at least one viscosity builder and at least one rheological control agent wherein the rheological control agent is an amphoteric polymer, the cationic groups of the amphoteric polymer being quaternary ammonium groups.

32 Claims, No Drawings

QUATERNARY NITROGEN CONTAINING AMPHOTERIC WATER SOLUBLE POLYMERS AND THEIR USE IN DRILLING FLUIDS

FIELD OF THE INVENTION

The present invention generally relates to quaternary nitrogen containing amphoteric polymers and their use in drilling fluids.

BACKGROUND OF THE INVENTION

The success of a well-drilling operation depends on many factors, none of which is more important than the drilling fluid or mud. Drilling fluids perform a variety of functions which influence the drilling rate, cost, efficiency and safety of the operation. More specifically, drilling muds prevent the influx of formation fluids into the wellbore, seal exposed permeable formations to prevent leakage of the drilling fluid into the formation, maintain the stability of exposed formulations, cool and lubricate the bit and drill string, hold back pressure and stabilize the formation, e.g., shale inhibition. How well the drilling fluid fulfills these requirements greatly affects the cost of the operation and the productivity of the well.

During operation, drilling fluids are pumped down a hollow drill string, through nozzles in the bit at the bottom of the well, and back up the annulus formed by the hole or casing and drill string to the surface. Once reaching the surface, the drilling fluid is passed through a series of vibrating screens, settling tanks, hydrocyclones and centrifuges to remove formation debris brought to the surface. It is thereafter treated with additives to obtain the desired set of properties; pumped back into the well and the cycle is repeated.

Drilling fluids are generally composed of liquids, e.g., water, petroleum oils, synthetic oils and other organic liquids; dissolved inorganic and organic additives; and suspended, finely divided solids of various types. Drilling fluids are classified as to the nature of the continuous phase; thus there are four main divisions: gaseous (including foam), water-base, oil-base, or synthetic. Growing concern among government and environmental agencies over the environmental impact of drilling fluids has led to a significant increase in the industry's reliance on water-based muds. In fact, about 85% of all drilling fluids used today are water-based systems. The types depend on the composition of the water phase (pH, ionic content, etc), viscosity builders (clays, polymers or a combination), filtration control agents (clays, polymers or a combination) and other rheological control agents (deflocculants or dispersants (qv)). Generally, there are six main categories or types of water-based muds:

Fresh Water.

Fresh water fluids range from clear water having no additives to high density muds containing clays, barite, and various organic additives. The composition of the mud is determined by the type of formation to be drilled. When a viscous fluid is required, clays and/or water-soluble polymers (qv) are added. Fresh water is ideal for formulating stable drilling fluids as many mud additives are most effective in a system of low ionic strength. Inorganic and/or organic additives control the rheological behavior of the clays, particularly at elevated temperatures. Water swellable and water soluble polymers and/or clays may be used for filtration control. Mud pH is generally alkaline and, in fact, viscosity control agents like the montmorillonite clays are more efficient at a pH>9. Sodium hydroxide is by far the most widely used alkalinity control agent. Freshwater muds can be weighted with insoluble agents to desired density required to control formation pressures.

Seawater.

Many offshore wells are drilled using a seawater system because of ready availability. Seawater muds generally are formulated and maintained in the same way that a freshwater mud is used. However, because of the presence of dissolved salts in seawater, more electrolyte stable additives are needed to achieve the desired flow and filtration (qv) properties.

Salt Water.

In many drilling areas both onshore and offshore, salt beds or salt domes are penetrated. Saturated salt muds are used to reduce the hole enlargement that would result from formation-salt dissolution by contact with an undersaturated liquid. In the United States, the salt formations are primarily made up of sodium chloride. In other areas, e.g., northern Europe, the salt may be composed of mixed salts, predominantly magnesium and potassium chlorides. It has become quite common to use high (20–23 wt % NaCl) salt muds in wells being drilled in deep (>500-m water depth) water regions of the Gulf of Mexico. The reasons are twofold: stabilization of water-sensitive shales and inhibition of the formation of gas hydrates. The high salinity of salt water muds may require different clays and organic additives than those used in fresh- or seawater muds. Salt water clays and organic polymers contribute to viscosity. Filtration properties are adjusted using starch (qv) or cellulosic polymers. The pH ranges from that of the makeup brine which may be somewhat acidic, to 9–11 through use of sodium hydroxide or lime.

Calcium Treated.

Fresh- or seawater muds may be treated with gypsum or lime to alleviate drilling problems that may arise from drilling water-sensitive shale or clay-bearing formations. Gyp muds (gypsum added) are generally maintained at a pH of 9–10, whereas lime muds (lime added) are in the 12–13 pH range. Calcium-treated muds generally require more additives to control flow and filtration properties than those without gypsum or lime.

Potassium Treated.

Generally potassium treated systems combine one or more polymers and a potassium ion source, primarily potassium chloride, in order to prevent problems associated with drilling certain water-sensitive shales. The flow and filtration properties may be quite different from those of the other water-base fluids. Potassium muds have been applied in most active drilling regions around the world. Environmental regulations in the United States have limited the use of potassium muds in offshore drilling owing to the apparent toxicity of high potassium levels in the bioassay test required by discharge permits.

Low Solids.

Fresh water, clay, and polymers for viscosity enhancement and filtration control make up low solid and so called non-dispersed polymer muds. Low solids muds are maintained using minimal amounts of clay and require removal of all but modest quantities of drill solids. Low solid muds can be weighted to high densities, but are used primarily in the unweighted state. The main advantage of these systems is the high drilling rate that can be achieved because of the lower colloidal solids content. Polymers are used in these systems to provide the desired rheology, especially xanthan has proven to be an effective solids suspending agent. These low solid muds are normally applied in hard formations where increasing the penetration rate can reduce drilling costs significantly and the tendency for solids buildup is minimal.

Bentonite is by far the most commonly used clay in drilling muds because it provides excellent rheological and filtration properties to the mud, especially in combination with polyelectrolytes like CMC. Bentonite clay which mainly is montmorillonite (a smectite type of clay) exists of very thin platelets (sheets). A number of attempts have been made to determine the particle size of sodium montmorillonite but this is rather difficult because of the flat, thin irregular shape of the platelets and because of the wide range of sizes. The clay platelets exhibit a superior ability to swell uniformly in fresh water upon shear application. The swelling of the dehydrated agglomerated bentonite clay when it is contacted with water is caused by a penetration of water molecules in between the clay platelets. The swelling pressure is so strong that the layers separate into smaller aggregates and even into individual unit layers with a thickness of 10 Å. Thus, a relatively stable suspension of the hydrated clay can be obtained.

In aqueous suspensions, the edges of the bentonite platelets are positively charged while the faces are negatively charged. Because of these opposite charges there is an interaction with the positive edges and negative faces. However in a fresh water hydrated bentonite suspension (without electrolytes) these electrostatic interactions are rather weak because of the thick bounded water layer around the clay platelets. This thick water layer keeps the particles that far from each other that the bentonite is almost completely dispersed but still a very weak flocculation remains as is shown by the gel properties and yield stress.

A wide variety of organic polymers also serve a number of useful purposes in drilling fluids such as increasing viscosity and controlling filtration rates, which often are directly related to the degree of flocculation and aggregation of the bentonite clay particles in the drilling mud. The ability to reduce fluid loss is also influenced by these properties, i.e., in order to build up a good filtercake to minimize filtrate loss into the formation, the clay suspension should be in a deflocculated condition. These polymers are either natural polysaccharides, e.g., starch, guar gum, xanthan gum, and other biopolymers; or derivatives of natural polymers, e.g., derivatives of cellulose, starch, guar and other biopolymers; or lignosulfonate, lignite and synthetic polymers, e.g., polymers and copolymers of acrylic acid, acrylonitrile, acrylamide, and 2-acrylamido-2-methylpropanesulfonic acid (AMPS). The most commonly used polymeric viscosity builders are the cellulosics, starches, xanthan gum, and polyacrylamides.

Sodium carboxymethyl cellulose (CMC) and polyanionic cellulose(PAC) are two of the more widely used anionic polymers in drilling fluids in order to control viscosity and filtration rates. The effectiveness of CMC, being a polyelectrolyte, as a viscosity builder has its limitations, however, as its effectiveness decreases with increasing electrolyte concentration. In fresh water low DS CMC's adsorb on bentonite while higher DS CMC's (e.g. PAC's) shows a decreased amount of adsorption. Only a very small amount of a low DS CMC (DS—0.7) is sufficient to realize complete dispersion of the bentonite as it adsorbs on the positive edges of the platelets. This complete dispersion results in a reduction of the gel-strength to almost zero. In general a good dispersed bentonite/CMC suspension gives a good build-up of the filter-cake and an excellent fluid loss reduction performance is obtained. Such a system does not, however, demonstrate significant gel-strength and yield point.

It is clear that the rheological properties of a drilling fluid determines very much the success of the overall drilling operation. The Theological properties of the mud determine very much (1) the hole cleaning efficiency and hole stability, (2) cuttings suspension efficiency, (3) mud hydraulics performance, (4) ease of mud handling operations, and (5) rate of penetration. The rheological requirements for these diverse purposes may often conflict, so it is necessary to optimize the mud properties in order to obtain the best overall performance. Optimal rheological properties are necessary in order to carry the drilled cuttings efficiently to the surface. While drilling, the high shear viscosity should not be too high to allow an efficient transmission of the hydraulic horsepower of the drilling fluid to the drill bit. But when the circulation is slow or interupted the viscosity should be high and the gel-strength should be sufficient to prevent/minimize settling of the cuttings. Such rheology profile can be obtained by using a thixotropic system, which in the case of a bentonite system can be realized with a somewhat flocculated system at which the particle links are temporarily broken by/during stirring and are only restored during rest. On the other hand a the drilling fluid should cover the wall of the borehole with a thin filtercake in order to stabilize the borehole and to prevent loss of the circulation fluid into the drilled porous formation. In general this is done most efficiently by a well dispersed clay suspension.

The rheology and thus the flow properties of a drilling mud is influenced by:

1. The state of hydration and dispersion of bentonite or other clay particles in the aqueous phase and the amount of them.
2. The rheology of the aqueous phase as it might be modified by additives (viscosifiers) e.g. by the polymers mentioned earlier.
3. The clay interparticle forces as well as by the interaction of the polymers with the clay and/or with each other.

Thus, the solids content is related to the mud rheology as well as to the mud density. And in general the higher the solid content of a mud (added clays and drilled cuttings which might become dispersed) the more difficult and time consuming the mud cleaning will be. In this respect low-solid mud systems can improve the rate of penetration.To maintain the desired rheological profile for such low-solid mud systems viscosifying polymers are added. Examples of such polymers are xanthan, high molecular weight CMC's and acrylic polymers.

The claimed invention relates to the use of quaternary nitrogen containing amphoteric water-soluble polymers which proved to be very efficient drilling fluid rheology modifiers especially for bentonite containing system while it allows very low uses of bentonite and provides the desired drilling fluid characteristics. The additives of the invention improve the overall performance of the mud by enhancing the following properties:

a pseudoplastic rheology behaviour
a sufficient Yield Point and gel-strength with a fast build up of the gel-strength in the first 10 sec
a low to moderate Plastic Viscosity (PV)
sufficient fluid loss reduction

SUMMARY OF THE INVENTION

The present invention generally relates to a water-based drilling fluid composition which comprises water, at least one viscosity builder, and at least one rheological control agent. The rheological control agent is preferably an amphoteric polymer containing both cationic groups and anionic groups, wherein said cationic groups comprise quaternary ammonium groups. Preferred amphoteric polymers are quaternary nitrogen containing water soluble polymers (QN-WSP's) such as quaternary nitrogen containing amphoteric carboxymethyl cellulose. The viscosity builder is preferably a smectite type of clay (e.g. bentonite).

The invention also contemplates a water-based drilling fluid system which comprises, as a rheological control agent, a combination of a cationic polymer wherein the cationic groups comprise quaternary ammonium groups and an anionic polymer, with or without the aforementioned amphoteric polymer.

DETAILED DESCRIPTION OF THE INVENTION

The present invention generally relates to a water based drilling fluid composition which comprises water, at least one viscosity builder, and at least one rheological control agent. The rheological control agent is preferable an amphoteric polymer containing both cationic groups and anionic groups, wherein said cationic groups comprise quaternary ammonium groups, i.e., amphoteric quaternary nitrogen containing water soluble polymers (QN-WSP's). In another embodiment, the invention contemplates a water-based drilling fluid system which comprises, as a rheological control agent, a combination of a cationic polymer wherein the cationic groups comprise quaternary ammonium groups and an anionic polymer, with or without the aforementioned amphoteric polymer. The drilling fluids of the present invention can comprise QN-WSP's either alone, or in combination with conventional polymer additives.

As a viscosity builder, the drilling fluid compositions of the present invention can contain any commercial clay used for increasing the viscosity of drilling fluids. Preferably, smectite type clays such as montmorillonites (bentonite) are employed, as well as mixed layer types, such as mixed later hydroxides, and attapulgite and sepiolite. Bentonite is the most preferred viscosity builder either alone or in combination with other commercial clays. Without wishing to be bound by any particular theory, it is believed that because of the strong interaction of the cationic groups of the QN-WSP's of the present invention with the bentonite particles of the drilling mud, the QN-WSP's of the present invention are very efficient in providing sufficient gel-strength and yield stress to a fresh water bentonite based mud.

The QN-WSP's of the present invention can be divided into two broad types: those containing synthetically derived water soluble polymers, and those containing semi-synthetically derived or natural water soluble polymers, e.g., polysaccharide derivatives.

The amphoteric QN-WSP's of the present invention comprising a polysaccharide derivative have the following general formula:

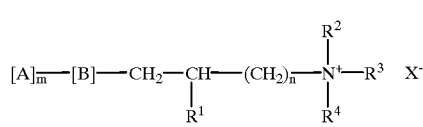

(I)

wherein $R^1$ is H or OH, $R^2$, $R^3$ and $R^4$ are the same or different and are selected from $C_1$–$C_{24}$ alkyl, $C_6$–$C_{24}$ aryl, $C_7$–$C_{24}$ aralkyl, $C_7$–$C_{24}$ alkaryl, $C_3$–$C_{24}$ cycloalkyl, $C_2$–$C_{24}$ alkoxyalkyl and $C_7$–$C_{24}$ alkoxyaryl groups, or $R^2$, $R^3$, $R^4$ and the quaternary nitrogen atom form an aliphatic or aromatic heterocyclic ring like a pyridinium ring and the like; n is an integer of 1 to 4, B is selected from O, OC(O), C(O)O, C(O)—NH, NHC(O), S, $OSO_3$, $OPO_3$, NH, or $NR^5$ where $R^5$ is a $C_2$–$C_6$ acyl, or a $C_1$–$C_4$ alkyl radical, $[A]_m$ an anionic water-soluble polysaccharide or polysaccharide derivative, m is greater than 10, preferably 10–50,000 and still more preferably 10–30,000, and $X^-$ is an anion.

Preferred polysaccharide starting materials for the amphoteric QN-WSP include but are not limited to members of the starch and cellulose families, the natural gums such as guar, bio-derived gums such as xanthan, and the like. Typically, the amphoteric polysaccharides contain or have been provided with an anionic and a cationic group and may contain also a non-ionic group or substituent. The most preferred polysaccharide starting materials include but are not limited to water soluble or swellable anionic cellulose ethers or esters, starch or starch derivatives, and/or anionic guar or guar derivatives. It should also be understood that substituted polysaccharides (e.g., carboxymethylated polysaccharides) are within the scope and meaning of polysaccharide starting materials.

The anionic group of the amphoteric polysaccharide preferably is a carboxylate (e.g. carboxymethyl), sulphonate (e.g. sulphoethyl), phosphate or phosphonate group, although one of ordinary skill in the art will recognize that other anionic groups can be readily employed. The most preferred anionic polysaccharide starting materials include, but are not limited to anionic group containing polysaccharides or polysaccharide derivatives including but not limited to carboxymethyl cellulose, sulphoethyl carboxymethyl cellulose, carboxymethyl cellulose wherein the cellulose is substituted with one or more nonionic substituents, carboxymethyl starch, carboxymethyl starch wherein the starch is substituted with one or more nonionic substituents, carboxymethyl guar, carboxymethyl guar wherein the guar is substituted with one or more nonionic substituents, xanthan gum, and mixtures thereof. Specific examples include carboxymethyl hydroxyethyl cellulose (CM-HEC), phosphate or phosphonate containing polysaccharide derivatives, and the like. A particularly preferred anionic polysaccharide starting material is carboxymethyl cellulose.

The amphoteric polysaccharide starting materials are provided with a quaternary nitrogen-containing group through various methods known to those of ordinary skill in the art. For example, the polysaccharide starting material can be quaternized with a quaternization agent which are quaternary ammonium salts to effect substitution of the polysaccharide chain with a quaternary nitrogen-containing group. In this regard, applicants refer to U.S. Pat. No. 4,940,785 which is incorporated herein by reference.

Typical quaternary ammonium salts which can be utilized include quaternary nitrogen-containing halides, halohydrins and epoxides. The quaternary ammonium salt may contain hydrophobes. Exemplary ammonium salts include one or more of the following:

3-chloro-2-hydroxypropyl dimethyidodecyl ammonium chloride; 3-chloro-2-hydroxypropyl dimethyloctadecyl ammonium chloride; 3-chloro-2-hydroxypropyl-dimethyloctyl ammonium chloride; 3-chloro-2-hydroxypropyl trimethyl ammonium chloride; 2-chloroethyl trimethyl ammonium chloride; and the like. Preferred quaternization agents include 2, 3-epoxypropyl trimethyl ammonium chloride , 3-chloro-2-hydroxypropyl trimethyl ammonium chloride; 3-chloro-2-hydroxypropyl dimethyidodecyl ammonium chloride; 3-chloro-2-hydroxypropyl dimethyltetradecyl ammonium chloride;3-chloro-2-hydroxypropyl dimethylhexadecyl ammoniu m chloride and 3-chloro-2-hydroxypropyl dimethyloctadecyl ammonium chloride.

Quaternization can also be achieved using a two-step synthesis of aminating the polysaccharide by reaction with an aminating agent, such as an amine halide, halohydrin or epoxide followed by quaternizing the product by reaction with quaternizing agents or mixtures thereof, containing a functional group which forms a salt with the amine. Preferred quaternizing agents include but are not limited to alkyl halides such as methyl-, ethyl-, propyl-, and benzyl-halides. The alkylation with the quaternizing agent to form the quaternized polysaccharide ethers may be conducted in a separate reaction step or may be combined in the etherification with the other alkylating agents.

The polysaccharides may also contain non-ionic groups or substituents to assist in providing the requisite hydrophilicity and/or hydrophobicity and/or the requisite electrolyte stability. To provide the polysaccharide with such a non-ionic substituent the polysaccharide may be alkylated with suitable alkylating agents or mixtures thereof using processes which are known in the art. Preferred non-ionic substituents include but are not limited to methyl, ethyl, hydroxyethyl, hydroxypropyl, dihydroxypropyl, benzyl, and hydrophobic groups such as 3-($C_1$-$C_{24}$ alkoxy)-2-hydroxypropyl, 3-($C_6$-$C_{24}$ aryloxy)-2-hydroxypropyl, 3-($C_7$-$C_{24}$ aralkoxy)-2-hydroxypropyl, 3-($C_7$-$C_{24}$ alkaryloxy)-2-hydroxypropyl groups, and halides, epoxides and/or glycidylethers of $C_1$-$C_{24}$ alkyl, $C_1$-$C_{24}$ alkoxy, $C_6$-$C_{24}$ aryloxy, $C_7$-$C_{24}$ aralkoxy, $C_7$-$C_{24}$ alkaryloxy and mixtures thereof. Substitution with these non-ionic substituents may be conducted in a separate reaction step or may be combined in the etherification with the other alkylating agents. The several substituents used may therefore be provided as substituents connected directly to the polysaccharide chain, the quaternary nitrogen or connected to other available ether substitutents. Alkylation is achieved by reacting an alkylating agent or mixtures thereof containing at least one functional group which is reactive (1) with the hydroxyl groups on the polysaccharide chain or ether substituents, or (2) with a tertiary nitrogen atom, producing a quaternary substituent, or (3) both.

The most preferred amphoteric QN-WSP's comprising a polysaccharide derivative include, but are not limited to any quaternary ammonium group (QN) containing polysaccharide derivatives such as, for example, QN-CMC, QN-sulphoethyl CMC, QN-CM-hydroxyethylcellulose, QN-CM cellulose (mixed) ether, QN-CM starch and QN-CM starch derivatives, QN-CM guar and QN-CM guar derivatives, QN phosphate or phosphonate containing polysaccharide derivatives and the like.

In another embodiment, the present invention contemplates water-based drilling fluids which utilize, as a rheological control agent, an amphoteric QN-WSP comprising a synthetic polymer derivative. These QN-WSP's comprise synthetic polymer derivatives which are prepared by copolymerizing anionic synthetic monomers (e.g., acrylates and/or acrylamides) with quaternary nitrogen containing cationic monomers (e.g., diallyl-dimethyl-ammonium chloride (DADMAC)) and which also may be copolymerized with nonionic monomers. Instead of copolymerization with an anionic monomer the amphoteric synthetic QN-WSP may also be derived by copolymerization of a cationic monomer with a non-ionic monomer which is at least partly hydrolyzed in a post-polymerization step resulting in an amphoteric polymer. In the QN-WSP the different monomers can be randomly distributed as well as block structures can be used in the context of the invention. Examples of the amphoteric polymer include quaternary ammonium (partially) hydrolyzed polyacrylamide, quaternary ammonium polyacrylate, quaternary ammonium (partially) hydrolyzed polyacrylamide copolymerized with acrylate monomers and mixtures thereof. The quaternary ammonium groups are incorporated in the polymer by using cationic monomers in the polymerization process or by a cationization reaction afterwards.

Suitable cationic starting monomers include but are not limited to diallyl dimethyl ammonium chloride (DADMAC) and its derivatives and those of the formula:

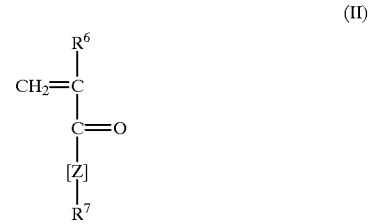

(II)

wherein $R^6$ is selected from H, OH or a $C_1$-$C_4$ alkyl group, or a hydroxyethyl-group; Z is NH or O and $R^7$ is a compound of formula III:

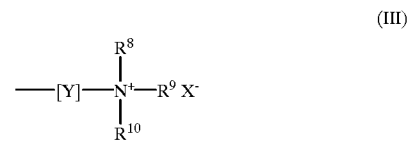

(III)

wherein Y is a linear or branched $C_1$-$C_6$ alkyl, $R^8$, $R^9$ and $R^{10}$ are the same or different and are selected from $C_1$-$C_{24}$ alkyl, $C_6$-$C_{24}$ aryl, $C_7$-$C_{24}$ aralkyl, $C_7$-$C_{24}$ alkaryl, $C_3$-$C_{24}$ cycloalkyl, $C_2$-$C_{24}$ alkoxyalkyl, and $C_7$-$C_{24}$ alkoxyaryl groups, or $R^8$, $R^9$, Rlo and the quaternary nitrogen atom form an aliphatic or aromatic heterocyclic ring such as a pyridinium ring and the like, n is an integer of 1 to 4 and X is an anion like chloride, bromide, iodide, sulphate, methylsulphate, nitrate, phosphate, acetate and the like.

Preferred quaternary ammonium containing monomers include diallyl dimethyl ammonium chloride (DADMAC), acryloyloxyethyl-trimethyl ammonium chloride (AETAC), methacrylamido propyl trimethyl ammonium chloride (MAPTAC), 3-acrylamido-3-methyl-butyl-trimethyl ammonium chloride and the like.

Suitable anionic groups for the amphoteric synthetic QN-WSP include, but are not limited to carboxylate, sulphonate, phosphate and phosphonate goups. A suitable way to introduce these groups into the amphoteric polymer is by copolymerization of these anionic monomers or monomers which yield an anionic group by partial or complete hydrolysis in a post-polymerization step with cationic monomers and possibly non-ionic monomers.

Preferred anionic monomers include but are not limited to acrylic acid esters, methacrylic acid esters, acrylamide, methacrylamide, and maleic acid anhydride, wherein said synthetic monomers yield an anionic group in a post polymerization step, acrylic acid, acrylates, methacrylic acid, 2-acrylamido-2-methyl-propane sulphonic acid, vinylsulphonate, vinylsulphonic acid, styrenesulphonate, styrene sulphonic acid, and mixtures thereof. The different monomers can be randomly distributed as well as block structures can be used in the context of the invention.

To regulate the charge density and the hydrophilic/hydrophobic balance of the amphoteric synthetic polymer, non-ionic monomers are optionally copolymerized with said cationic monomers and anionic monomers. Some non-ionic monomers such as acrylamide and maleic acid anhydride may yield anionic groups as they may be partly or completely hydrolyzed during or after the polymerization. Suitable non-ionic monomers are acrylamide and its derivatives, acrylates such as acrylic acid esters or methacrylic acid esters, maleic acid anhydride and its derivatives and other non-ionic vinylmonomers. These monomers may also contain hydrophobic groups such as alkyl, aryl, aralkyl and alkaryl groups containing 1–24 carbon atoms. Preferred non-ionic monomers are acrylamide, methyl acrylate, methyl methacrylate, ethyl acrylate, ethyl methacrylate, hydroxyethyl acrylate, hydroxyethyl methacrylate, hydroxypropyl acrylate, hydroxypropyl methacrylate, butyl acrylate, butyl methacrylate, vinylacetate, styrene and mixtures thereof.

The synthetic polymer containing QN-WSP's of the present invention can be prepared by various means which is readily apparent to one of ordinary skill in the art. For example, in order to produce high molecular weight amphoteric or cationic polymers, acrylamide and/or acrylic acid is copolymerized with varying proportions of amino derivatives of acrylamide, acrylic acid esters or methacrylic acid esters. The cationic charge is present in the form of a mineral acid or quaternary ammonium salt. Typical quaternary ammonium containing co-monomers include diallyl dimethyl ammonium chloride (DADMAC), acryloyloxyethyltrimethyl ammonium chloride (AETAC), methacrylamido propyl trimethyl ammonium chloride (MAPTAC), 3-acrylamido-3-methyl-butyl-trimethyl ammonium chloride and the like.

In a most preferred embodiment of the invention, the amphoteric QN-WSP's comprising a synthetic polymer derivative preferably contain on average 1 to 500 quaternary ammonium containing monomers on every 1000 monomer units, or more preferably 10 to 300 on every 1000 monomer units and most preferably 50 to 200 quaternary ammonium containing monomer units per total of 1000 monomer units, and it contains preferably 1 to 900 anionic group containing monomer units on every 1000 monomer units and most preferably 100 to 600 anionic group containing monomer units on every 1000 monomer units, and the polymer preferably has an average molecular weight of >50,000, more preferably >250,000 and most preferably >500,000.

In a most preferred embodiment, the present invention contemplates a quaternary nitrogen containing carboxymethyl cellulose (QN-CMC). QN-CMC is an amphoteric, water-soluble polymer containing both anionic and cationic charges. But also other zwitterionic polymers (polymers with the positive and negative charges on the same pendant groups, e.g. betaines) or on the same backbone (ampholytes) can be used. The betaines necessarily have an equal balance of anionic and cationic groups. Amphoteric polymers such as QN-CMC which actually is a polyampholyte (having the positive and negative charge on the same polymer backbone) can be charge-balanced or charge-imbalanced. Also mixtures can be used of cationic- and anionic polymers (e.g. QN-Starch, QN-HEC and QN-Polyacrylamides with CMC or PAC) which form an amphoteric solution and interpolymer complexes can be formed. When the stoichiometry of the charges is 1:1 or close to, a water insoluble poly-salt can be formed, dependant on the presence and concentration of other electrolytes. In the context of the invention, charge-Ratios and electrolyte concentrations are chosen in such a way that a soluble system is obtained.

Amphoteric polymers show unusual solution properties. Charge balanced poly-ampholytes often are more soluble and show higher viscosities in salt than in pure water solution. Therefore amphoteric polymers have found utility as water and brine viscosifiers and as brine drag reduction agents. In all of these applications unusual interplay of positive and negative charges on the same group or backbone, between chains and/or between chains and external electrolytes play an important role. These charge interactions in the different (electrolyte) environments have a large part in determining the resulting viscosity of the solutions.

The most important commercial clays used for increasing the viscosity of drilling fluids are the smectite type of clays such as montmorillonites (bentonite), as well as mixed layer types and attapulgite and sepiolite. Although the QN-WSP's of the present invention can usefully be employed as rheology modifiers in most water-based drilling fluids, they are most useful in those systems which contain bentonite either alone or in combination with other commercial clays.

As previously mentioned, the state of flocculation and aggregation are the most important factors in determining the rheology of a drilling mud. The ability to reduce the fluid loss is also determined by these properties. CMC is one of the most popular polymers in use to disperse the bentonite in drilling muds which improves fluid loss reduction and to a lesser extent, to modify the viscosity of the mud. CMC does not, however, provide the desired yield point and gel-strength to the mud. Because of the strong interaction of the cationic groups of QN-CMC with the bentonite particles, QN-CMC is a very efficient material to provide sufficient gel-strength and yield stress to a fresh water bentonite based mud. More particularly, the strong interaction of QN-CMC with the bentonite particles causes bridging flocculation which gives the desired rheology. Additionally, the extent of flocculation can be regulated by the DS(QN), i.e., the more cationic groups attached to the cellulose backbone the more pronounced the flocculation. However, while increased flocculation is beneficial for rheology it is not for the fluid loss reducing capability because the more the system is flocculated, the less it provides sufficient fluid loss reduction. For example, a QN-CMC with a rather low MS(QN) and gives a weakly flocculated system which gives the desired gel-strength and yield stress a also gives sufficient fluid loss reduction. It also has been found that by using a high molecular weight QN-CMC the amount of bentonite used can be reduced. Another advantage of the QN-CMC is that it is compatible with commonly used (anionic) polymers like CMC, PAC and starch or other generally used fluid loss reducing and viscosifying polymers, which means that in cases where the fluid loss should be reduced further such materials can be used together with QN-CMC.

To prepare QN-CMC one can start either with cellulose or with the cellulose already reacted with monochloro-acetic acid or its (sodium) salt. To provide the cellulose with the cationic group an etherification reaction in the presence of a small amount of caustic soda is performed with either CHPTAC or GTAC.

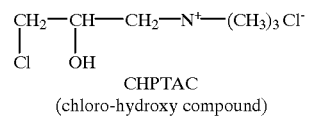

CHPTAC
(chloro-hydroxy compound)

-continued

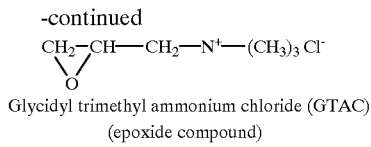

Glycidyl trimethyl ammonium chloride (GTAC)
(epoxide compound)

Using CHPTAC the etherification reaction goes also via the epoxide. The difference with GTAC is that one equivalent caustic soda will be consumed to 20 form the epoxide and one equivalent NaCl will be produced. The reaction of GTAC with CMC needs only a catalytic amount of caustic soda. In case the etherification is performed in the sequence of first reacting the alkalicellulose with monochloroaceticacid (MCA) after which the etherification with CHPTAC or GTAC is performed without a purification of the CMC, some of the CHPTAC or GTAC might also react with the byproducts of the MCA-etherification. This is also the case when the etherification with MCA and CHPTAC or GTAC is performed at the same time. Other QN-(CM)-Polysaccharides can be derived in the same way as QN-CMC is prepared and processes to do so are known in the art.

Production of water swellable and water soluble polysaccharide ethers in general is done by suspending the polysaccharide in a diluent. When the polysaccharide is cellulose it may be used as milled cellulose or cut cellulose sheets. Suitable and readily available cellulose starting materials include cotton linters and purified wood pulp celluloses. Suitable diluents include ethanol, isopropyl alcohol, tert-butyl alcohol, acetone, water, methylethyl ketone and mixtures thereof. The reactions may be conducted in a relatively large amount of diluent or with a minimal amount of diluent as desired, i.e., using either a so called slurry or a so called dry process.

Typically, the polysaccharide is reacted with an alkali metal hydroxide to prepare an alkali metal polysaccharide. The amount of alkali metal hydroxide per saccharide repeating unit may vary, depending on the type and amount of alkylating agents used. Typically, a molar ratio of between 0.001 and 5, respectively, is used. If desired, during the alkylation additional alkali metal hydroxide can be added or excess of the alkali metal hydroxide can be neutralized. To prevent uncontrolled degradation of the (alkalized) polysaccharide polymer, it is preferred to exclude oxygen from the reaction vessel during the alkalization and alkylation.

After reaction of the polysaccharide with a suitable amount of the alkali metal hydroxide, for the production of an amphoteric polysaccharide the alkali metal polysaccharide may be reacted first with the anionic alkylating reagent, e.g. monochloroacetic acid or its alkali metal salt, followed by the reaction with the cationic alkylating reagent, e.g. CHPTAC or GTAC, at a suitable temperature and for a time sufficient to provide the desired level of substitution. Alternatively, the cationic alkylating reagent may be added first, after which the anionic alkylating reagent is allowed to react, or the alkali metal polysaccharide may be simultaneously reacted with the different alkylating reagents. A further alternative reaction path is to purify the anionically alkylated polysaccharide before the cationic alkylating reagent is added. This generally does increase the reaction selectivity and/or yield of the cationic alkylating reagent.

In another preferred embodiment of the present invention non-ionic alkylating reagents are incorporated in the reaction step either added before, after or together with the anionic and cationic alkylating reagents. Also here the cationization may be performed after the already alkylated polysaccharide has been purified.

In the context of the present invention the quaternary ammonium modified polysaccharide derivatives may be applied either as purified or as unpurified materials. Of the purified materials the byproducts have been removed, e.g. by extraction with an alcohol/water mixture.

When the quaternary ammonium modified polysaccharide is an amphoteric or cationic cellulose ether the material useful for the present invention typically has an average degree of polymerization ($MW_{polymer}=MW_{monomer\ unit}*DP$) of greater than 30, preferably greater than 100 and typically in the range of ~30 to 6,000, preferably 100 to 5,000, an average degree of substitution of (i.e. DS) of the anionic substituent in the range of 0.05 to 1.4, preferably 0.3 to 1.4, and a molar substitution (i.e. MS) of the non-ionic substituent in the range of 0.05 to 5, preferably 0.1 to 3.5, and a molar substitution of the cationic group in the range of 0.005 to 1.0, preferably 0.01 to 0.6.

In a preferred embodiment of the present invention the QN-WSP is an amphoteric carboxymethyl cellulose (QN-CMC). The QN-CMC typically have an average degree of polymerization of greater than 30, preferably greater than 100 and typically in the range of 30 to 6,000, preferably 100 to 5,000, more preferably 1000 to 5000, an average degree of substitution of (i.e. DS) of the anionic carboxymethyl substituent in the range of 0.2 to 1.4, preferably 0.5 to 1.4, more preferably 0.7 to 1.3, and a molar substitution of the cationic group in the range of 0.005 to 1.0, preferably 0.01 to 0.6, more preferably 0.01 to 0.3.

Finally, the claimed invention contemplates a water-based drilling mud formulation which comprises, as a rheological control agent, a combination of a cationic polymer wherein the cationic groups comprise quaternary ammonium groups and an anionic polymer, either alone or in combination with the aforementioned amphoteric polymers.

The cationic polymers employable in the context of the present invention include, but are not limited to cationic group containing polysaccharides or polysaccharide derivatives, cationic group containing synthetic polymers and mixtures thereof. Examples of cationic group containing polysaccharides or polysaccharide derivatives include but are not limited to quaternary (QN)-HEC, QN-cellulose (mixed) ether, QN-starch, QN-starch derivatives, QN-guar, QN-guar derivatives, mixtures thereof and the like. Examples of cationic group containing synthetic polymers include but are not limited to QN-polyacrylamide, polyacrylate homo- and copolymers containing cationic groups, QN-polyacrylamide copolymerized with non-ionic acrylate monomers, QN-polyamines, QN-polyethyleneimines, mixtures thereof and the like.

These cationic polymers are utilized in combination with the anionic polymers previously exemplified in this application, including the anionic group containing polysaccharides and the anionic group containing synthetic polymers which are the building blocks of the amphoteric polymers of the present invention.

Finally, the drilling fluids of the present invention can optionally contain various other ingredients conventionally employed in water-based fluids. For example, such additional ingredients can include conventional organic polymer additives such as CMC, PAC, starch, modified starch, xanthan, etc. Additionally, the drilling fluids of the present invention can contain weighing agents, thinners, inhibiting agents, electrolytes, pH adjusting agents, etc. The pH of the drilling fluids of the present invention is preferably maintained at a pH of from 8–11, preferably 8.5–10.5 and still more preferably 9–10.

Although there is a wide variety of water-based drilling fluids (muds) employable in the context of the present invention, a typical mud in accordance with the present invention contains the following ingredients:

water as the main component;

viscosity builder in an amount of from 5–100, more preferably 10–60 and most preferred 20–40 kg/m$^3$;

amphoteric rheological control agent in an amount of from 0.01–10, more preferably 0.05–5, and still more preferably 0.1–3 kg/m$^3$;

alkaline agent(s) in an amount effective to adjust pH to about 9–10; and various other additives/polymers including, but not limited to CMC, PAC, starch, modified starch, xanthan, weighing agents, thinners, inhibiting agents such as glycol derivatives and the like, electrolytes and the like.

For a QN-CMC based drilling fluid, the drilling fluid would ideally have a yield point of between 5 and 15 pascals, not develop progressive gel-strengths over time, plastic viscosity of 10–25 mPa.s and an API RP42 fluid loss of 5–10 mL. A QN-CMC based drilling fluid having these properties would typically be comprised of fresh water, 0.2–0.6 kg/m$^3$ of QN-CMC, 20–40 kg/m$^3$ unpeptized sodium bentonite and sufficient caustic soda to adjust the pH of the drilling fluid to a pH of from 8.5 to 10.5.

When a combination of a quaternary ammonium containing cationic polymer and an anionic polymer is used the QN-WSP preferably has on average a low cationic charge density of about 1 to 300 cationic groups per 1000 monomer or polysaccharide units, more preferably about 1 to 100 cationic groups per 1000 30 monomer or polysaccharide units. Suitable ratio's in which the cationic polymer may be used with an anionic and /or amphoteric polymer are 1:20 to 1:1, preferably 1:10 to 1:5. Typically, the total amount of the cationic polymer, the anionic polymer and/or the amphoteric polymer added to a mud system is in the range of 0.1 to 4 kg/m$^3$.

The invention will now be illustrated by means of the following non-limiting examples.

EXAMPLE 1

Use of QN-CMC's in Drilling operations.

The following provides examples of the effectiveness and advantages of QN-CMC in actual downhole drilling situations. Included in the example is a general description of the wells drilled with QN-CMC fluids, usage/cost comparisons of QN-CMC fluids versus gel-chemical fluids, rheological comparison of QN-CMC fluids versus gel-chemical fluids and advantages noted for the QN-CMC materials.

General Well Description:

Three wells were drilled using the QN-CMC drilling fluid in Alberta, Canada at locations 08-33-39-20 W4, 11-09-40-19 W4 and 05-35-39-21 W4. All wells were drilled to a final depth of between 1407 m and 1422 m in the same general manner:

Wells were started by rotary drilling a hole with a 311 mm diameter drill bit from surface ground location to a depth of approximately 200 m. Upon reaching this approximate 200 m depth, surface casing of 219 mm size was run into the bottom of the hole and subsequently cemented into place in the usual manner. The drilling fluid used to help achieve the drilling process was a mixture of sodium bentonite and caustic as commonly practiced in the industry.

Rotary drilling of the well continued using a 200 mm diameter bit and proceeded to a final and total depth of between 1407 m and 1422 m. The drilling fluid used from the surface casing depth to between 1225 m and 1269 m was water treated with calcium and a partially hydrolyzed polyacrylamide, as often practiced in the industry. Drilled solids contained within the calcium water were removed from the drilling fluid in the usual manner using shaker screens and centrifuges.

From the depths of 1225 m to 1269 m to between the final total depth, a QN-CMC based drilling fluid was used. The QN-CMC fluid is referred to as the main hole mud system. The principle constituents in the QN-CMC main hole mud were bentonite at a concentration of between 20–35 kg/m$^3$, QN-CMC at a concentration of between 0.3–0.6 kg/m$^3$, caustic soda to provide a pH in the range of 8.5 to 10.0, and 0–0.2 kg/m$^3$ of a low viscosity polyanionic cellulosic polymer (PAC). The total circulating main hole mud system of between 80–100 m$^3$ was designed to provide an API fluid loss of between 7–8 mL under standard API test conditions and sufficient viscosity to remove the drilled cuttings generated in the drilling of the well.

Usage/Cost Comparisons

A comparison of material usage and costs of the wells drilled with the QN-CMC drilling fluids and a group of nearby wells drilled with a gel-chemical fluid is given in Table 1. The gel-chemical wells were drilled in a similar manner to those previously described for the QN-CMC fluids, except for the use of gel-chemical drilling fluid in place of the QN-CMC fluid. The general composition of the gel-chemical fluid is sodium bentonite at a concentration of 30–60 kg/m3, polyanionic cellulosic polymer at a concentration of 0.5–2.0 kg/m3 and caustic soda to provide a pH of 8.0–10.0.

TABLE 1

Material Usage and Cost Comparison of Wells Drilled with QN-CMC and Gel-chemical Drilling Fluids

| Well Identification | Fluid System Used | Well Depth | Sxs bentonite - main hole | Sxs QN-CMC - main hole | Sxs PAC* - main hole | Mud material cost - main hole |
|---|---|---|---|---|---|---|
| 08-33-39-20W4 | QN-CMC | 1407 m | 76 | 8 | 0 | $3134 Can |
| 11-09-40-19W4 | QN-CMC | 1422 m | 106 | 3 | 1 | $2305 Can |
| 05-35-39-21W4 | QN-CMC | 1415 m | 90 | 3 | 1 | $2526 Can |

TABLE 1-continued

Material Usage and Cost Comparison of Wells Drilled with QN-CMC and Gel-chemical Drilling Fluids

| Well Identification | Fluid System Used | Well Depth | Sxs bentonite - main hole | Sxs QN-CMC - main hole | Sxs PAC* - main hole | Mud material cost - main hole |
|---|---|---|---|---|---|---|
| AVERAGES | | 1415 m | 91 | 4.7 | 0.7 | $2655 |
| 03-01-40-21W4 | Gel-chemical | 1429 m | 161 | 0 | 4 | $2665 Can |
| 13-26-39-21W4 | Gel-chemical | 1425 m | 166 | 0 | 9 | $4848 Can |
| 15-34-39-21W4 | Gel-chemical | 1471 m | 160 | 0 | 18 | $5973 Can |
| 05-30-39-20W4 | Gel-chemical | 1351 m | 153 | 0 | 14 | $4987 Can |
| AVERAGES | | 1419 m | 160 | 0 | 11.3 | $4618 |

*PAC = Polyanionic cellulose

The data in Table 1 clearly indicates that, on average, less bentonite is being used on the wells drilled with QN-CMC as compared to the wells drilled with gel-chemical drilling fluid. Usage of CMC derived materials (QN-CMC and PAC) was also clearly less on average for the QN-CMC wells. The lower material usage on the wells drilled with QN-CMC is reflected on the lower average mud material costs in the main hole as compared to the wells drilled with a gel-chemical fluid.

Rheological Comparison:

Rheological properties of a drilling fluid are important to the drilling operation in order to efficiently clean drilled cuttings from the wellbore. In simple terms, the ideal drilling fluid is shear thinning or thixotropic in nature: having low viscosity at high shear rates (as seen at the drill bit) and high viscosities at lower shear rates (as seen in the annular space between the drill-string and wellbore wall).

Table 2 provides rheological comparisons of the wells described above and in Table 1. In all cases, the rheologies reported in Table 2 were in the main hole section where either QN-CMC fluid or gel-chemical fluid was being used in the rotary drilling operation.

Plastic viscosities and yield points are derived from the Bingham Plastic rheological model, a model commonly used to describe drilling fluid Theological properties. The higher the YP/PV (yield point/plastic viscosity) ratio, the more thixotropic is the nature of the drilling fluid and the better the drilling fluid is to remove drilled cuttings from the wellbore. The average YP/PV ratio for the QN-CMC drilling fluids is approximately twice that of the average gel-chemical fluids.

The "n" and "K" values, laminar flow index and laminar flow consistency factor, respectively, are factors derived from the Power Law rheological model, another model commonly used to characterize drilling fluid rheological properties.

Shear thinning behavior is described by the "n" value, where the lower the "n" values the more shear thinning or thixotropic is the fluid. Similar to the Bingham Plastic model, the QN-CMC fluids indicate better shear thinning characteristics by nature of their lower "n" values than the offset wells drilled with gel-chemical fluids.

Gel strengths, although not derived from any rheological model, are commonly used to describe the ability of drilling fluids to hold and suspend solids when the drilling fluid is

TABLE 2

Rheological Comparison of QN-CMC fluids vs. gel-chemical fluids

| WELL ID (mud) | DEPTH AT MUD CHECK | PLASTIC VISCOSITY (mPa · s) | YIELD POINT (Pa) | YP/PV RATIO* | n VALUE (no units) | K VALUE (poise) | 10 sec. GEL STRENGTH (Pa) | 10 min. GEL STRENGTH (Pa) |
|---|---|---|---|---|---|---|---|---|
| 08-33 (QN-CMC) | 1266 m | 16 | 7 | 0.44 | 0.62 | 3.21 | 7 | 10 |
| | 1267 m | 16 | 14 | 0.88 | 0.45 | 13.83 | 6 | 9 |
| 11-09 (QN-CMC) | 1280 m | 6 | 5.5 | 0.92 | 0.44 | 5.73 | 3 | 3 |
| | 1282 m | 29 | 10 | 0.34 | 0.67 | 3.83 | 4.5 | 7 |
| | 1419 m | 20 | 11 | 0.55 | 0.56 | 6.47 | 4 | 7 |
| 05-35 (QN-CMC) | 1355 m | 14 | 11 | 0.79 | 0.47 | 9.59 | 6 | 8 |
| AVE. | | 17 | 10 | 0.65 | 0.54 | 7.11 | 5 | 7 |
| 03-01 (gc**) | 1343 m | 12 | 2.5 | 0.21 | 0.77 | 0.71 | 1 | 3 |
| 13-26 (gc**) | 1200 m | 9 | 3 | 0.33 | 0.68 | 1.12 | 2 | 7 |
| | 1400 m | 14 | 3 | 0.21 | 0.77 | 0.84 | 2 | 14 |
| 15-34 (gc**) | 1352 m | 12 | 4 | 0.33 | 0.68 | 1.40 | 4 | 12 |
| 05-30 (gc**) | 1171 m | 8 | 3.5 | 0.44 | 0.62 | 1.60 | 2 | 6 |
| | 1371 m | 19 | 6 | 0.32 | 0.69 | 2.10 | 4 | 13 |
| AVERAGE | | 12 | 4 | 0.31 | 0.70 | 1.29 | 3 | 9 |

*YP/PV Ratio = yield point/plastic viscosity ratio
**gc = gel-chemical drilling fluid subjected to low shear rates. An "ideal" drilling fluid will have good initial gel strength (typically 5–12 Pa for drilling operations) and not develop progressive gel strengths over time. The average gel strengths of the QN-CMC fluids are better than the average gel strengths of the gel-chemical fluids.

Advantages of the QN-CMC System

In summary, the advantages of the QN-CMC drilling fluid system in accordance with the present invention, as compared to the commonly used gel-chemical fluid, for the wells drilled in above cited example include:
Less material usage of sodium bentonite
Less material usage of CMC derived materials
Lower total material cost for the main hole mud system
Better rheological profile

We claim:

1. A water-based drilling fluid composition which comprises water, at least one viscosity builder and at least one rheological control agent, the rheological control agent being an amphoteric polymer having cationic groups in the form of quaternary ammonium groups, the amphoteric polymer comprising a quaternary ammonium compound of the formula:

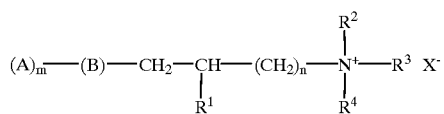
(I)

wherein $R^1$ is H or OH, $R^2$, $R^3$ and $R^4$ are the same or different and are selected from the group consisting of $C_1$–$C_2$, alkyl, $C_6$–$C_{24}$ aryl, $C_7$–$C_{24}$ aralkyl, $C_7$–$C_{24}$ alkaryl, $C_3$–$C_{24}$ cycloalkyl, $C_2$–$C_{24}$ alkoxyalkyl and $C_7$–$C_{24}$ alkoxyaryl groups, or $R^2$, $R^3$, $R^4$ and the quaternary nitrogen atom form an aliphatic or aromatic heterocyclic ring; n is an integer of 1 to 4, B is O, OC(O), C(O)O, C(O)—NH, NHC(O), S, $OSO_3$, $OPO_3$, NH, or $NR^5$ where $R^5$ is a $C_2$–$C_6$ acyl, or a $C_1$–$C_4$ alkyl radical, $(A)_m$ is an anionic water-soluble polysaccharide or substituted polysaccharide, m is greater than 10 and $X^-$ is an anion.

2. The composition of claim 1, wherein $(A)_m$ is selected from the group consisting of carboxymethyl cellulose, sulphoethyl carboxymethyl cellulose, carboxymethyl cellulose wherein the cellulose is substituted with one or more nonionic substituents, carboxymethyl starch, carboxymethyl starch wherein the starch is substituted with one or more nonionic substituents, carboxymethyl guar, carboxymethyl guar wherein the guar is substituted with one or more nonionic substituents, xanthan gum, and mixtures thereof.

3. The composition of claim 1, wherein said viscosity builder is a smectite type of clay.

4. The composition of claim 1, wherein said viscosity builder is selected from the group consisting of bentonite, a mixed metal layer hydroxide, attapulgite, sepiolite and mixtures thereof.

5. The composition of claim 1, wherein $X^-$ is an anion selected from the group consisting of chloride, bromide, iodide, sulphate, methylsulphate, nitrate, phosphate, acetate and mixtures thereof.

6. A water-based drilling fluid composition which comprises water, at least one viscosity builder and at least one rheological control agent, the rheological control agent being an amphoteric polymer having cationic groups in the form of quaternary ammonium groups, the amphoteric poly mer comprising a quaternary ammonium compound of the formula:

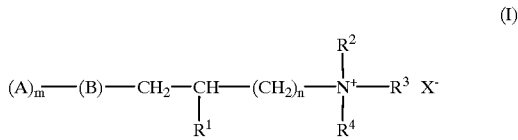
(I)

wherein $R^1$ is H or OH, $R^2$, $R^3$, $R^4$ and the quaternary nitrogen atom form a pyridinium ring; n is an integer of 1 to 4, B is O, OC(O), C(O)O, C(O)—NH, NHC(O), S, $OSO_3$, $OPO_3$, NH, or $NR^5$ where $R^5$ is a $C_2$–$C_6$ acyl, or a $C_1$–$C_4$ alkyl radical, $(A)_m$ is an anionic water-soluble polysaccharide or substituted polysaccharide, m is greater than 10 and $X^-$ is an anion.

7. The composition of claim 1, wherein said amphoteric polymer is selected from the group consisting of quaternary ammonium carboxymethyl cellulose, quaternary ammonium sulphoethyl carboxymethyl cellulose, quaternary ammonium hydroxyethyl carboxymethyl cellulose, quaternary ammonium carboxymethyl starch, quaternary ammonium carboxymethyl guar and mixtures thereof.

8. The composition of claim 1, wherein said amphoteric polymer is substituted with at least one nonionic substituent selected from the group consisting of methyl, ethyl, hydroxyethyl, hydroxypropyl, dihydroxypropyl, benzyl, 3-($C_1$–$C_{24}$ alkoxy)-2-hydroxypropyl, 3-($C_6$–$C_{24}$ aryloxy)-2-hydroxypropyl, 3-($C_7$–$C_{24}$ aralkoxy)-2-hydroxypropyl, 3-($C_7$–$C_{24}$ alkaryloxy)-2-hydroxypropyl groups, and mixtures thereof.

9. The composition of claim 1, wherein said viscosity builder comprises bentonite and said amphoteric polymer is quaternary ammonium carboxymethyl cellulose.

10. A water-based drilling fluid composition which comprises water, at least one viscosity builder and at least one rheological control agent, the rheological control agent being an amphoteric synthetic polymer derived from copolymerizing an anionic synthetic monomer, a quaternary nitrogen atom containing cationic monomer, and optionally at least one nonionic monomer, said amphoteric polymer being selected from the group consisting of (partially) hydrolyzed polyacrylamide containing quaternary ammonium groups, polyacrylate containing quaternary ammonium groups, and (partially) hydrolyzed polyacrylamide containing quaternary ammonium groups copolymerized with acrylate monomers and mixtures thereof.

11. The composition of claim 10, wherein said quaternary nitrogen atom containing cationic monomer is diallyl dimethyl ammonium chloride.

12. The composition of claim 10, wherein said quaternary nitrogen atom containing cationic monomer is a compound of the formula 11:

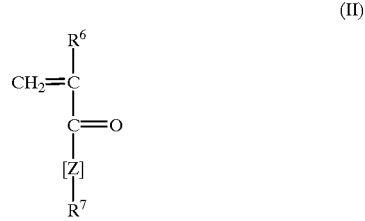
(II)

wherein $R^6$ is H, OH or a $C_1$–$C_4$ alkyl group, or a hydroxyethyl-group; Z is NH or O and $R^7$ is a compound of formula III:

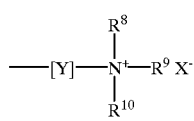
(III)

wherein Y is a linear or branched $C_1$–$C_6$ alkyl, $R^8$, $R^9$ and $R^{10}$ are the same or different and are selected from the group consisting of $C_1$–$C_{24}$ alkyl, $C_6$–$C_{24}$ aryl, $C_7$–$C_{24}$ aralkyl, $C_7$–$C_{24}$ alkaryl, $C_3$–$C_{24}$ cycloalkyl, $C_2$–$C_{24}$ alkoxyalkyl, and $C_7$–$C_{24}$ alkoxyaryl groups, or $R^8$, $R^9$, $R^{10}$ and the quaternary nitrogen atom form an aliphatic or aromatic heterocyclic ring, n is an integer of 1 to 4 and $X^-$ is an anion.

13. The composition of claim 12, wherein said quaternary nitrogen atom containing cationic monomer is selected from the group consisting of acryloyloxyethyl-trimethyl ammonium chloride (AETAC), methacrylamido propyl trimethyl ammonium chloride (MAPTAC), 3-acrylamido-3-methylbutyl-trimethyl ammonium chloride and mixtures thereof.

14. The composition of claim 12, wherein $X^-$ is an anion selected from the group consisting of chloride, bromide, iodide, sulphate, methylsulphate, nitrate, phosphate and acetate.

15. The composition of claim 10, wherein said viscosity builder is selected from the group consisting of bentonite, mixed metal layered hydroxide, attapulgite, sepiolite and mixtures thereof.

16. The composition of claim 10, wherein said amphoteric polymer includes at least one nonionic monomer selected from the group consisting of maleic acid anhydride, acrylamide, methyl acrylate, methyl methacrylate, ethyl acrylate, ethyl methacrylate, hydroxyethyl acrylate, hydroxyethyl methacrylate, hydroxypropyl acrylate, hydroxypropyl methacrylate, butyl acrylate, butyl methacrylate, and mixtures thereof.

17. The composition of claim 10, wherein said at least one nonionic monomer is a vinyl monomer optionally substituted with a hydrophobic group selected from the group consisting of $C_1$–$C_{24}$ alkyl, $C_6$–$C_{24}$ aryl, $C_7$–$C_{24}$ aralkyl, $C_7$–$C_{24}$ alkaryl, and mixtures thereof.

18. A method of enhancing the rheological behavior of a water-based drilling fluid composition which comprises adding to said composition a rheological enhancing effective amount of at least one amphoteric polymer, the amphoteric polymer comprising a quaternary ammonium compound of the formula:

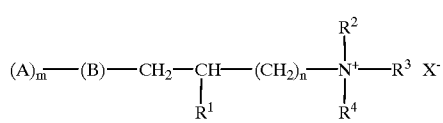
(I)

wherein $R^1$ is H or OH, $R^2$, $R^3$ and $R^4$ are the same or different and are selected from the group consisting of $C_1$–$C$_alkyl $C_6$–$C_{24}$ aryl, $C_7$–$C_{24}$ aralkyl, $C_7$–$C_{24}$ alkaryl, $C_3$–$C_{24}$ cycloalkyl, $C_2$–$C_{24}$ alkoxyalkyl and $C_7$–$C_{24}$ alkoxyaryl groups, or $R^2$, $R^3$, $R^4$ and the quaternary nitrogen atom form an aliphatic or aromatic heterocyclic ring; n is an integer of 1 to 4, B is O, OC(O), C(O)O, C(O)—NH, NHC(O), S, $OSO_3$, $OPO_3$, NH, or NRR where $R^5$ is a $C_2$–$C_6$ acyl, or a $C_1$–$C_4$ alkyl radical, $(A)_m$ is an anionic water-soluble polysaccharide or substituted polysaccharide, m is greater than 10 and $X^-$ is an anion.

19. A method of enhancing the rheological behavior of a water-based drilling fluid composition which comprises adding to said composition a rheological enhancing effective amount of at least one amphoteric polymer, said amphoteric polymer being selected from the group consisting of (partially) hydrolyzed polyacrylamide containing quaternary ammonium groups, polyacrylate containing quaternary ammonium groups, and (partially) hydrolyzed polyacrylamide containing quaternary ammonium groups copolymerized with acrylate monomers and mixtures thereof.

20. The method of claim 18, wherein said quaternary ammonium compound of said amphoteric polymer is selected from the group consisting of quaternary ammonium carboxymethyl cellulose, quaternary ammonium sulphoethyl carboxymethyl cellulose, quaternary ammonium hydroxyethyl carboxymethyl cellulose, quaternary ammonium carboxymethyl starch, quaternary ammonium carboxymethyl guar and mixtures thereof.

21. The composition of claim 1, wherein the water is fresh water.

22. The composition of claim 1, further comprising carboxy methyl cellulose.

23. The composition of claim 22, wherein the carboxy methyl cellulose is polyanionic cellulose.

24. The composition of claim 1, wherein the molar substitution of the cationic group of the amphoteric polymer is from about 0.0005 to about 1.0.

25. The composition of claim 6, wherein $(A)_m$ is selected from the group consisting of carboxymethyl cellulose, sulphoethyl carboxymethyl cellulose, carboxymethyl cellulose wherein the cellulose is substituted with one or more nonionic substituents, carboxymethyl starch, carboxymethyl starch wherein the starch is substituted with one or more nonionic substituents, carboxymethyl guar, carboxymethyl guar wherein the guar is substituted with one or more nonionic substituents, xanthan gum, and mixtures thereof.

26. The composition of claim 6, wherein said viscosity builder is a smectite type of clay.

27. The composition of claim 6, further comprising polyanionic cellulose.

28. The composition of claim 10, wherein the water is fresh water.

29. The composition of claim 10, wherein said amphoteric polymer contains on average 1 to 500 quaternary ammonium group containing cationic monomers on every 1000 monomer units and 1 to 900 anionic group containing monomer units on every 1000 monomer units.

30. The composition of claim 10, further comprising carboxy methyl cellulose.

31. The composition of claim 30, wherein the carboxy methyl cellulose is polyanionic cellulose.

32. The composition of claim 10, wherein said amphoteric polymer includes at least one nonionic monomer selected from the group consisting of vinyl acetate, styrene and mixtures thereof.

* * * * *

UNITED STATES PATENT AND TRADEMARK OFFICE
CERTIFICATE OF CORRECTION

PATENT NO. : 6,281,172 B1
DATED : August 28, 2001
INVENTOR(S) : Warren et al.

It is certified that error appears in the above-identified patent and that said Letters Patent is hereby corrected as shown below:

Column 17,
Line 34, "$C_1$-$C_2$, alkyl," should read -- $C_1$-$C_{24}$, alkyl, --
Lines 40 and 43, "(A)*m*" should read -- (A)m --

Column 18,
Line 15, "(A)*m*" should read -- (A)m --

Signed and Sealed this

Sixth Day of August, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO. : 6,281,172 B1
DATED : August 28, 2001
INVENTOR(S) : Warren et al.

It is certified that error appears in the above-identified patent and that said Letters Patent is hereby corrected as shown below:

Column 17,
Line 34, "$C_1$-$C_2$, alkyl," should read -- $C_1$-$C_{24}$, alkyl, --
Lines 40 and 43, "$(A)_m$" should read -- $(A)_m$ --

Column 18,
Line 15, "$(A)_m$" should read -- $(A)_m$ --
Line 55, "11:" should read -- II: --

Column 19,
Line 62, "$C_1$-$C$_alkyl" should read -- $C_1$-$C_{24}$ alkyl, --

Column 20,
Line 3, "NRR" should read -- $NR^5$ --
Lines 4 and 34, "$(A)_m$" should read -- $(A)_m$ --

This certificate supersedes Certificate of Correction issued August 6, 2002.

Signed and Sealed this

Sixth Day of August, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,281,172 B1
DATED : August 28, 2001
INVENTOR(S) : Warren et al.

It is certified that error appears in the above-identified patent and that said Letters Patent is hereby corrected as shown below:

Column 17,
Line 34, "$C_1$-$C_2$, alkyl," should read -- $C_1$-$C_{24}$, alkyl, --
Lines 40 and 43, "$(A)_m$" should read -- $(A)_m$ --

Column 18,
Line 15, "$(A)_m$" should read -- $(A)_m$ --
Line 55, "11:" should read -- II: --

Column 19,
Line 62, "$C_1$-C_alkyl" should read -- $C_1$-$C_{24}$ alkyl, --

Column 20,
Line 3, "NRR" should read -- $NR^5$ --
Lines 4 and 34, "$(A)_m$" should read -- $(A)_m$ --

This certificate supersedes Certificate of Correction issued August 6, 2002.

Signed and Sealed this

Fifteenth Day of October, 2002

Attest:

Attesting Officer

JAMES E. ROGAN
Director of the United States Patent and Trademark Office